US009264171B2

(12) United States Patent
Chang et al.

(10) Patent No.: US 9,264,171 B2
(45) Date of Patent: Feb. 16, 2016

(54) MULTI-MODE FIBER-BASED OPTICAL TRANSMISSION/RECEPTION APPARATUS

(71) Applicant: Electronics and Telecommunications Research Institute, Daejeon (KR)

(72) Inventors: Sun-Hyok Chang, Daejeon (KR); Hwan-Seok Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 15 days.

(21) Appl. No.: 14/250,029

(22) Filed: Apr. 10, 2014

(65) Prior Publication Data
US 2015/0030325 A1    Jan. 29, 2015

(30) Foreign Application Priority Data
Jul. 24, 2013 (KR) .................. 10-2013-0087584

(51) Int. Cl.
H04B 10/00 (2013.01)
H04J 14/04 (2006.01)
(52) U.S. Cl.
CPC ..................................... H04J 14/04 (2013.01)
(58) Field of Classification Search
USPC ................................................ 398/140–143
See application file for complete search history.

(56) References Cited

U.S. PATENT DOCUMENTS

| 6,525,853 | B1 * | 2/2003 | Stuart | 398/115 |
|---|---|---|---|---|
| 6,801,687 | B2 * | 10/2004 | Pierce | 385/28 |
| 6,868,236 | B2 * | 3/2005 | Wiltsey et al. | 398/183 |
| 7,864,820 | B2 * | 1/2011 | Shimotsu | 372/6 |
| 8,391,655 | B2 * | 3/2013 | Ryf | 385/29 |
| 8,538,275 | B2 * | 9/2013 | Essiambre et al. | 398/201 |
| 8,891,964 | B2 * | 11/2014 | Cvijetic et al. | 398/45 |
| 8,965,217 | B2 * | 2/2015 | Nolan et al. | 398/143 |
| 2002/0003923 | A1 * | 1/2002 | Ranka et al. | 385/28 |
| 2010/0329670 | A1 * | 12/2010 | Essiambre et al. | 398/43 |
| 2010/0329671 | A1 * | 12/2010 | Essiambre et al. | 398/44 |
| 2011/0243490 | A1 * | 10/2011 | Ryf | 385/1 |
| 2011/0243574 | A1 * | 10/2011 | Essiambre et al. | 398/200 |
| 2012/0224861 | A1 * | 9/2012 | Winzer et al. | 398/143 |
| 2013/0148963 | A1 * | 6/2013 | Cvijetic et al. | 398/45 |
| 2015/0030325 | A1 * | 1/2015 | Chang et al. | 398/44 |

* cited by examiner

Primary Examiner — Agustin Bello
(74) Attorney, Agent, or Firm — William Park & Associates Ltd.

(57) ABSTRACT

An optical transmission apparatus includes: a transmission light source configured to generate single-mode light of a specific wavelength; a power coupler configured to split the light generated by the transmission light source into a plurality of light sections; at least one modulator configured to modulate an electrical signal carrying different data into at least one optical signal using the light section from the power coupler; and a mode multiplexer configured to convert the modulated optical signal into a different mode, and to transmit the mode-converted optical signal to a fiber.

18 Claims, 8 Drawing Sheets

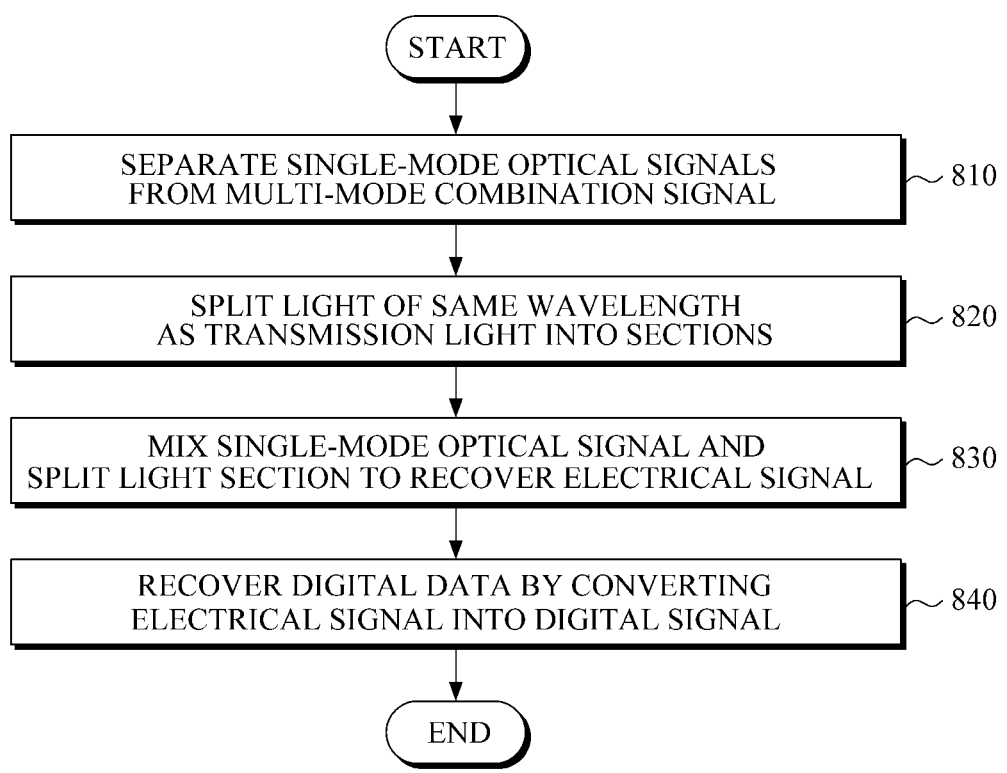

MULTI-MODE FIBER-BASED OPTICAL TRANSMISSION/RECEPTION APPARATUS

CROSS-REFERENCE TO RELATED APPLICATION(S)

This application claims priority from Korean Patent Application No. 10-2013-0087584, filed on Jul. 24, 2013 in the Korean Intellectual Property Office, the disclosure of which is incorporated herein by reference in its entirety.

BACKGROUND

1. Field

The following description relates to an optical communication system, and more particularly, to a multi-mode fiber-based optical transmission/reception apparatus and method capable of transmitting different signals according to fiber modes.

2. Description of the Related Art

An optical fiber used for optical communications includes a single-mode fiber and a multi-mode fiber. The optical fiber is characterized by a profile in which at least one core for light propagation is surrounded by a cladding. Since an index of refraction of the core is greater than that of the cladding, light is fully reflected and propagates through the fiber.

A wavelength of propagating light and a core diameter may determine the shape of light, i.e., a mode that can be supported by a fiber. A core diameter of a fiber used in existing optical communications may be 8 μm for a single mode fiber, and 50 μm for a multi-mode fiber. That is, a larger core diameter produces more modes.

The number of propagation modes may be determined by the design of the core size and distribution of refractive index, and a fiber designed to support multiple propagation modes is a multi-mode fiber, or a few-mode fiber (FMF).

In prior art, a single-mode fiber modulates data using laser that generates the single mode and transmits modulated data, whereas a multi-mode fiber modulates data using laser that generates all higher modes and transmits modulated data. However, the multi-mode fiber may provide a short transmission distance up to only several hundred meters for 10 Gb/s signals, due to high mode interference.

SUMMARY

The following description relates to a multi-mode fiber-based optical transmission/reception apparatus and method capable of modulating a different signal according to a mode, transmitting the modulated signal, and thereby increasing the transmission capacity to the number of modes.

In one general aspect, there is provided an optical transmission apparatus including: a transmission light source configured to generate single-mode light of a specific wavelength; a power coupler configured to split the light generated by the transmission light source into a plurality of light sections; at least one modulator configured to modulate an electrical signal carrying different data into at least one optical signal using the light section from the power coupler; and a mode multiplexer configured to convert the modulated optical signal into a different mode, and transmit the mode-converted optical signal to a fiber.

In another general aspect, there is provided an optical reception apparatus including: a mode demultiplexer configured to separate a multi-mode combination optical signal transmitted through a fiber into single-mode optical signals; a reception light source configured to generate light of a same wavelength as light of a transmission light source; a power coupler configured to split the light of the reception light source into a plurality of sections; at least one demodulator configured to mix the single-mode signals separated by the mode demultiplexer and the light sections split by the power coupler to generate a baseband signal and convert the baseband signal to an electrical signal; and a digital signal processor configured to recover digital data by converting the electrical signal into a digital signal.

In another general aspect, there is provided an optical reception apparatus including: a mode demultiplexer configured to separate a multi-mode combination optical signal transmitted through a fiber into single-mode optical signals; a power coupler configured to split light of a transmission light source which has been separated by the mode demultiplexer; at least one demodulator configured to mix the single-mode signals separated by the mode demultiplexer and light split by the power coupler to generate a baseband signal and convert the baseband signal to an electrical signal; and a digital signal processor configured to recover digital data by converting the electrical signal into a digital signal.

In yet another general aspect, there is provided a multi-mode fiber-based optical transmission method of an optical transmission apparatus, the multi-mode fiber-based optical transmission method including: splitting single-mode light of a specific wavelength into a plurality of light sections; modulating at least one electrical signal carrying different data into at least one optical signal using the split light section; and converting the modulated optical signal into a different mode, and transmitting the mode-converted optical signal to a fiber.

In another general aspect, there is provided a multi-mode fiber-based optical reception method of an optical reception apparatus, the multi-mode fiber-based optical reception method including: separating a multi-mode combination optical signal transmitted through a fiber into single-mode optical signals; splitting light into a plurality of sections, the light with a same wavelength as that of light of a transmission light source; mixing the single-mode signals separated from the multi-mode combination signal and the split light sections to generate a baseband signal, and converting the baseband signal to an electrical signal; and recovering digital data by converting the electrical signal into a digital signal.

Other features and aspects will be apparent from the following detailed description, the drawings, and the claims.

BRIEF DESCRIPTION OF THE DRAWINGS

FIG. 8 is a flowchart illustrating a multi-mode fiber-based optical reception method according to an exemplary embodiment.

Figure 1:
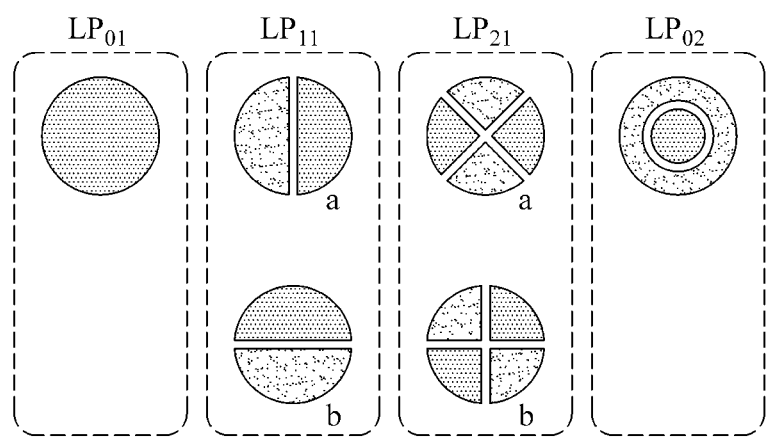
FIG. 1 is a diagram illustrating an example of modes propagating through a step-index io fiber according to prior art.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an example of modes propagating through a step-index fiber according to prior art.

Referring to FIG. 1, as a size of a core region is increased with a constant difference of refractive indices between the core region and a cladding region, the propagation modes that are supported by the fiber may vary from the left to the right in FIG. 1. $LP_{01}$ mode is a fundamental mode which essentially sits in the profile of even the smallest core. A fiber that is designed to support only $LP_{01}$ mode is referred to as "single mode fiber (SMF)." By increasing the size of a core, mode $LP_{11a}$ and mode $LP_{11b}$ also can be supported by the fiber. Mode $LP_{11a}$ and mode $LP_{11b}$ are degenerated modes with the same propagation constant. With a further increased size of the core, mode $LP_{21a}$, mode $LP_{21b}$, and mode $LP_{02}$ also can be supported by the fiber.

The number of modes propagating through the fiber can be controlled by changing a fiber design, such as a size of a core and a distribution of refractive index. Generally, in the case of SMF, data is modulated using laser that generates mode $LP_{01}$, and the modulated data is transmitted. In the case of a multi-mode fiber, data is modulated using laser that generates any higher modes including modes $LP_{01}$, $LP_{11a}$, and $LP_{11b}$, and the modulated data is transmitted.

Figure 2:
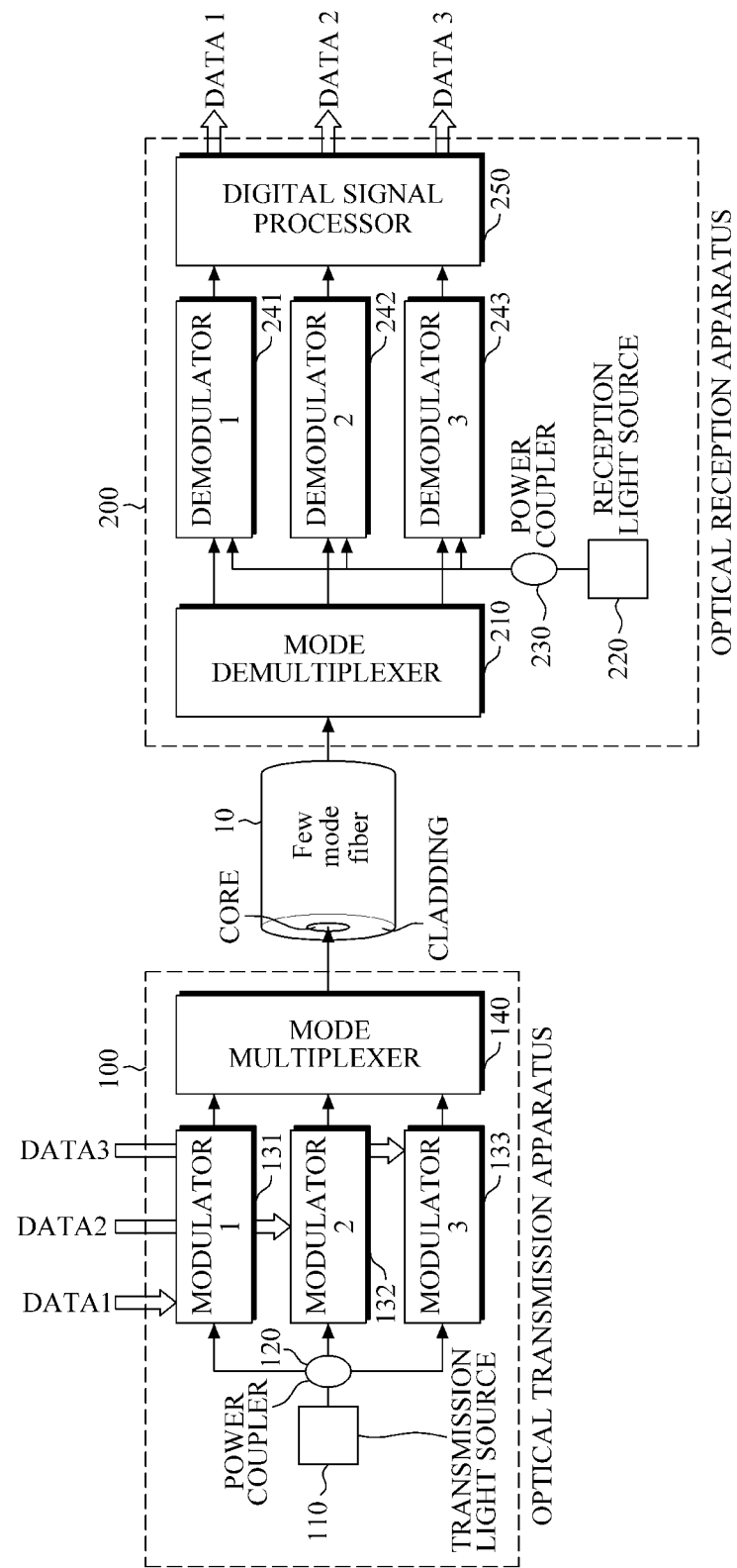
FIG. 2 is a diagram illustrating an example of a multi-mode fiber based optical transmission system according to an exemplary embodiment.

FIG. 2 is a diagram illustrating an example of a multi-mode fiber based optical transmission system according to an exemplary embodiment.

Referring to FIG. 2, the multi-mode fiber based optical transmission system includes an optical transmission apparatus 100 and an optical reception apparatus 200. The optical transmission apparatus 100 and the optical reception apparatus 200 transmit and receive data through a few-mode fiber (FMF) 10.

The optical transmission apparatus includes a transmission light source 110, a power coupler 120, at least one modulators 131, 132, and 133, and a mode multiplexer 140.

The transmission light source 110 generates single-mode light of a specific wavelength, and generates LP01 shown in FIG. 1.

The power coupler 120 splits the light into several sections. In this case, the light is split into the number of sections corresponding to the capacity of the FMF 10, and then the split light sections are transmitted to the modulators 131, 132, and 133. Although the example shown in FIG. 2 assumes there are three modes, the number of modes may vary.

The modulators 131, 132, and 133 convert electrical signals carrying different data into optical signals by use of light split by the power coupler 120. Here, various modulation schemes may be used, including non-return-to-zero (NRZ), quadrature phase shift keying (QPSK), and quadrant amplitude modulation (QAM). The number of modulators 131, 132, and 133 may be determined by the number of modes that the fiber can support.

The mode multiplexer 140 converts the optical signals, which have been converted by the modulators 131, 132, and 133, into different modes, and inputs the optical signals with different modes to the FMF 10. For example, referring to FIGS. 1 and 2, a signal connected to modulator 1 131 is converted into mode $LP_{01}$, a signal connected to modulator 2 132 is converted into mode $LP_{11a}$, a signal connected to modulator 3 133 is converted into mode $LP_{11b}$, and then the mode-converted signals are combined into one signal and transmitted to the optical reception apparatus 200 through the FMF 10. The mode multiplexer 140 will be described in detail with s reference to FIGS. 4 through 6.

Referring again to FIG. 2, the optical reception apparatus 20 includes a demultiplexer 210, a reception light source 220, a power coupler 230, at least one demodulator 241, 242, and 243, and a digital signal processor 250.

The mode demultiplexer 210 separates the multi-mode combination optical signal into a number of single-mode optical signals. For example, the combination optical signal of the multiple modes $LP_{01}$, $LP_{11a}$, and $LP_{11b}$ are separated into optical signals of $LP_{01}$ mode, and the separated signals are output.

The reception light source 220 generates light of the same wavelength as the light of the transmission light source, and outputs the generated light.

The power coupler 230 splits the light generated by the reception light source 220 into a number of sections corresponding to the number of demodulators 241, 242, and 243.

The demodulators 241, 242, and 243 generates a baseband signal by mixing the single-mode optical signal separated by the mode demultiplexer 210 and the light section split by the power coupler 230, and converts the generated baseband signal into an electrical signal.

The digital signal processor 250 recovers digital data by converting the electrical signal that is output from at least one of the demodulators 241, 242, and 243. In addition, the digital signal processor 250 compensates for a phase and frequency offset of a digital signal after converting the electrical signal into the digital signal, and recovers the digital data through the compensation of polarization separation and chromatic dispersion. Further, the digital signal processor 250 eliminates crosstalk among the modes, which may be caused by interference between the different modes during the transmission of the signal through the FMF 10.

Figure 3:
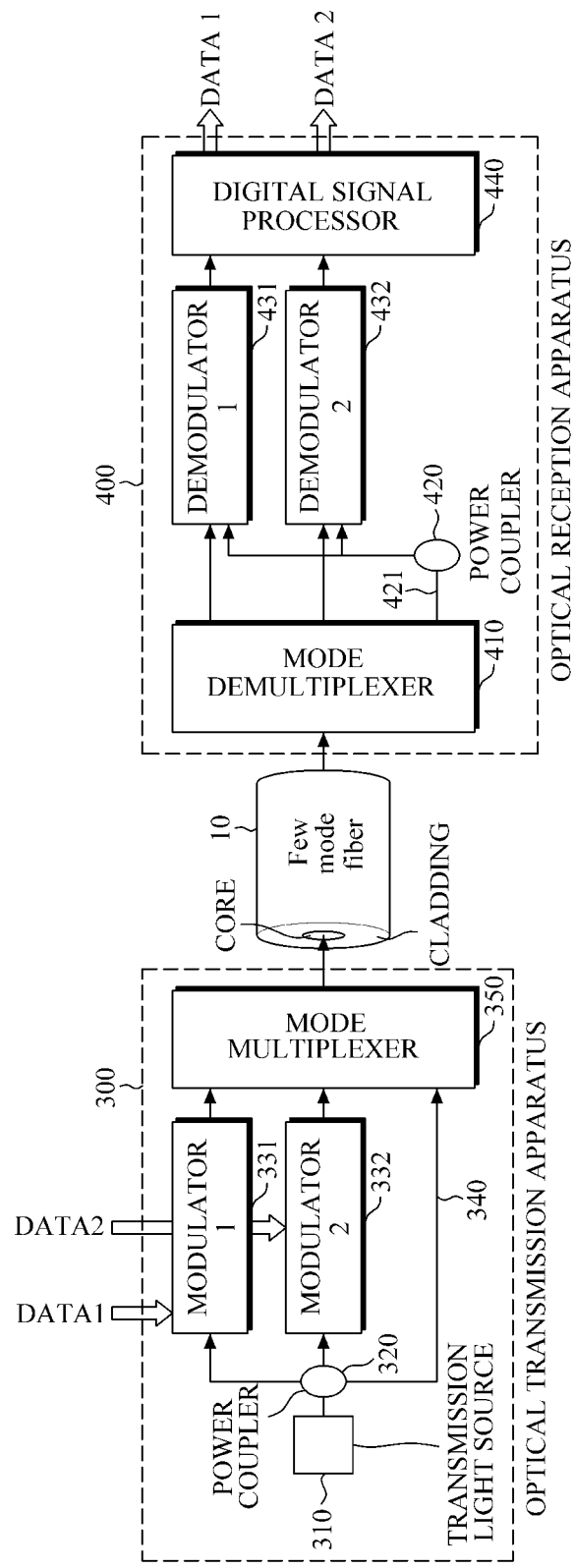
FIG. 3 is a diagram illustrating another example of a multi-mode fiber based optical transmission system according to another exemplary embodiment.

FIG. 3 is a diagram illustrating another example of a multi-mode fiber based optical transmission system according to another exemplary embodiment.

The configuration and operation of the multi-mode fiber based optical transmission system shown in FIG. 3 are similar to those of the multi-mode fiber based optical transmission system shown in FIG. 2, and thus only the different operation and configuration thereof will be described in detail.

Referring to FIG. 3, the number of modulators 331 and 332 is determined by subtracting 1 from the number of modes that a few-mode fiber (FMF) 10 can support. The example of FIG. 3 provides one less modulator than the example shown in FIG. 2.

The mode multiplexer 350 receives transmission light section which is split and directly transmitted from a power coupler 320, and at least one optical signal converted by at least one of the modulators 331 and 332, and transmits a combination signal to the FMF 10. In this example, one of the modes that the FMF 10 can support is used to transmit an output from the transmission light source 310, along with data. For example, if the FMF 10 can support three modes, data is transmitted over two modes, and light output from the transmission light source 310 is transmitted intact over one mode.

Hence, an optical reception apparatus 400 in FIG. 3 does not need an individual reception light source 220 as shown in FIG. 2. A power coupler 420 splits light from a mode demultiplexer 410 into a number of light sections. The number of demodulators 431 and 432 may be determined by subtracting 1 from the number of modes that the FMF 10 can carry. Thus, the compensation of a frequency offset between the transmission light source and the reception light source is not required, and thereby the configuration of the optical transmission apparatus 400 can be simplified.

Various exemplary embodiments of the mode multiplexer and the mode demultiplexer will be described in detail with reference to FIG. 4 to FIG. 6.

Figure 4:
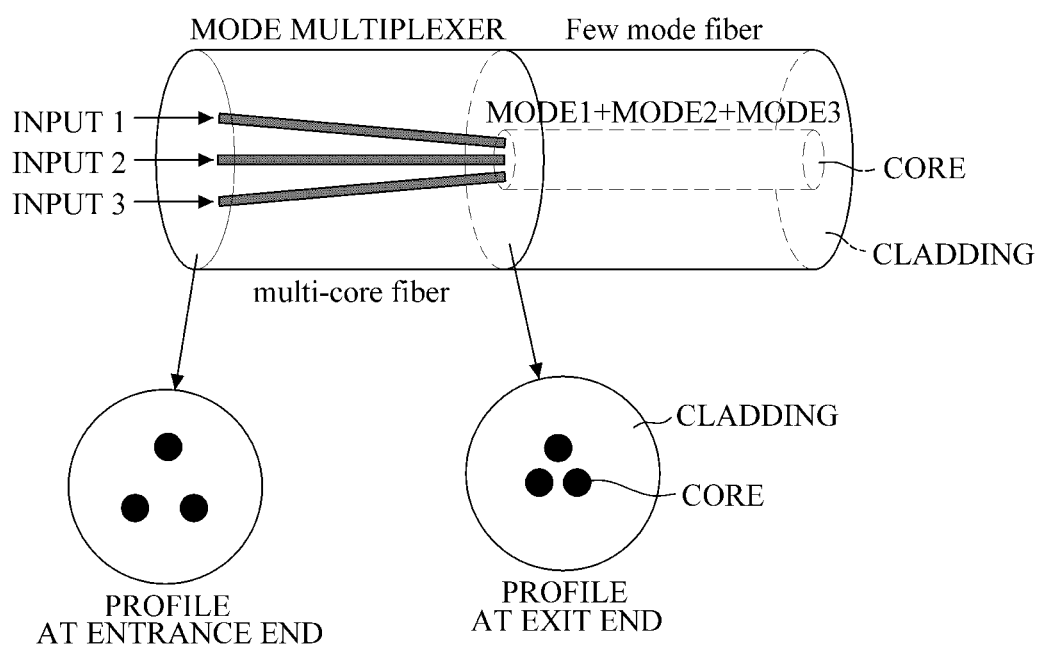
FIG. 4 is a diagram illustrating an example of a mode multiplexer or a mode demultiplexer according to an exemplary embodiment.

FIG. 4 is a diagram illustrating an example of a mode multiplexer or a mode demultiplexer according to an exemplary embodiment.

Referring to FIG. 4, the mode multiplexer may be formed by a multi-core fiber which includes the same number of cores as the number of modes to be multiplexed. For example, for multiplexing three modes as shown in FIG. 4, the multi-core fiber may have three cores. The example of FIG. 4 assumes that a few-mode fiber, as the multi-core fiber, is able to support only three modes $LP_{01}$, $LP_{11a}$, and $LP_{11b}$.

In addition, as shown in FIG. 4, gaps between neighboring multi-cores gradually decrease toward an exit end. Accordingly, due to the wider gaps between the cores, the signal interferences do not occur at the entrance end of the multi-core fiber.

As the gaps between the cores decrease toward the exit end of the multi-core fiber, the three cores are arranged closer together in a regular triangular formation at the exit end of the fiber. When optical signals of a single mode transmitted to the entrance end of the fiber reaches the exit end, interference occurs among the signals, and the modes of the optical signals appear to be very similar to modes $LP_{01}$, $LP_{11a}$, and $LP_{11b}$ of FMF. That is, when three optical signals are input to one fiber, the output of the fiber becomes a linear-combination of modes $LP_{01}$, $LP_{11a}$ and $LP_{11b}$.

On the contrary, the mode demultiplexer may be formed of a multi-core fiber with the same number of cores as the number of multiplexed modes, wherein gaps among the cores increase toward an exit end of the fiber.

Figure 5:
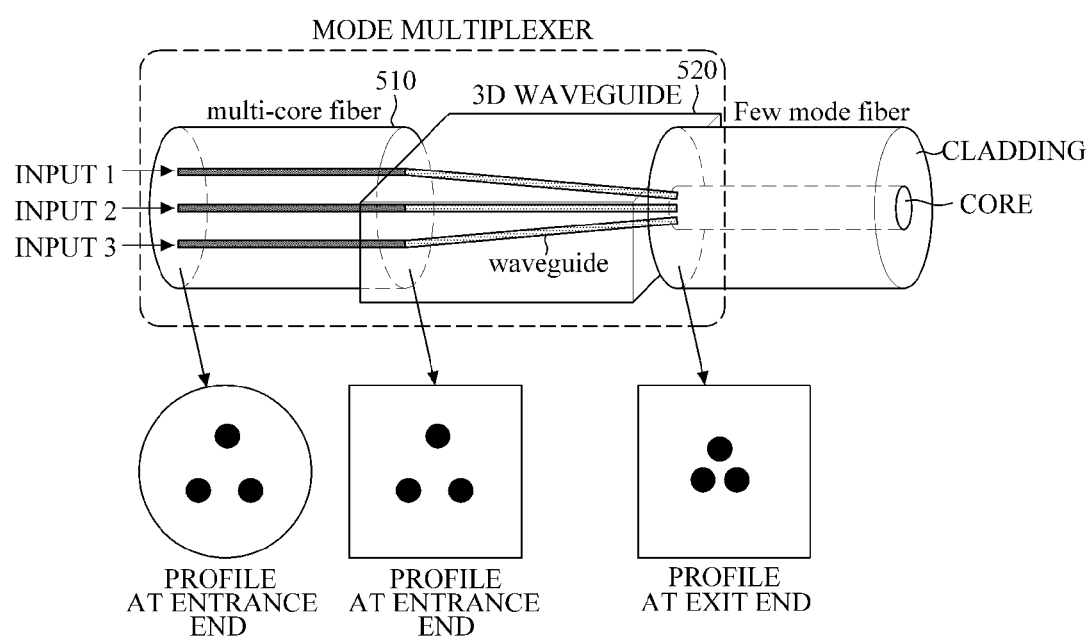
FIG. 5 is a diagram illustrating an example of a mode multiplexer or a mode demultiplexer according to another exemplary embodiment.

FIG. 5 is a diagram illustrating an example of a mode multiplexer according to another exemplary embodiment.

Referring to FIG. 5, the mode multiplexer includes a multi-core fiber 510 and a waveguide 520.

The multi-core fiber 510 has the same number of cores as the number of modes to be multiplexed, and the cores extend in parallel to one another. The waveguide 520 connects the multi-core fiber 510 and another optical fiber, and has the same number of cores as the modes to be multiplexed wherein gaps between the cores decrease toward an exit end of the waveguide 520. The waveguide 520 is made of glass or crystal with a 3-dimensional structure by partially changing an index of refraction thereof.

On the contrary, the mode demultiplexer may include a multi-core fiber and a waveguide, wherein the multi-core fiber has the same number of cores as the number of the multiplexed modes, the cores extending in parallel to each other, and the waveguide includes the same number of cores as the number of the multiplexed modes and connects another fiber and the multi-core fiber with the cores, wherein the gaps between the cores of the waveguide increase toward an exit end of the waveguide.

Figure 6:
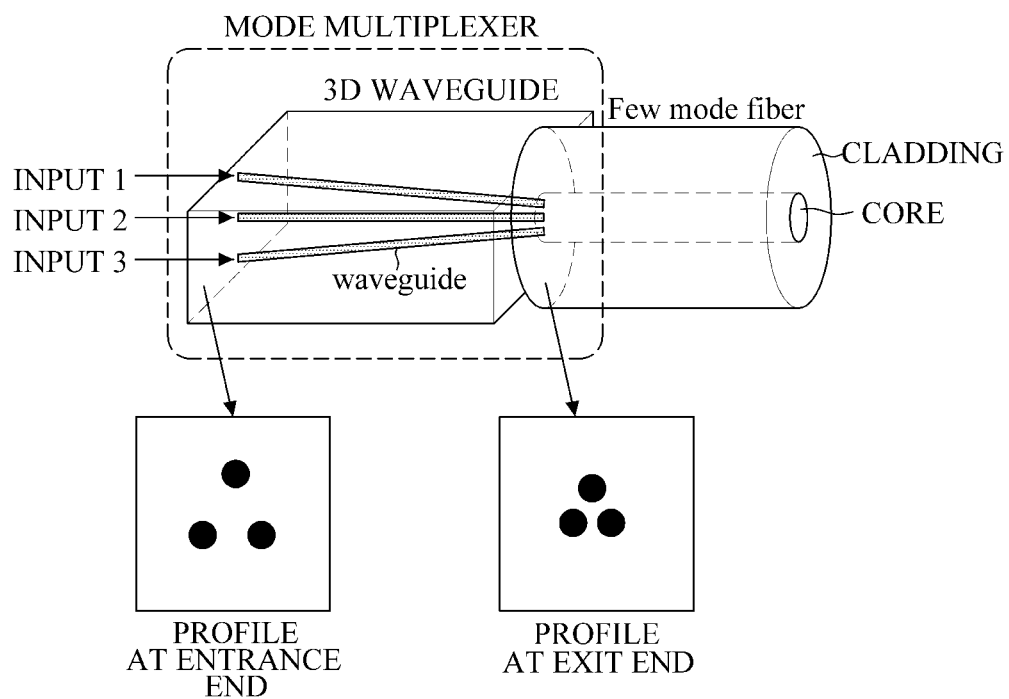
FIG. 6 is a diagram illustrating an example of a mode multiplexer according to yet another exemplary embodiment.

FIG. 6 is a diagram illustrating an example of a mode multiplexer according to yet another exemplary embodiment.

Referring to FIG. 6, the mode multiplexer includes a waveguide which has the same number of cores as the number of modes to be multiplexed, and gaps between the cores decrease toward an exit end of the waveguide.

The mode demultiplexer may include a waveguide which has the same number of cores as the number of multiplexed modes, and gaps between the cores increase toward the exit end of the waveguide.

Figure 7:
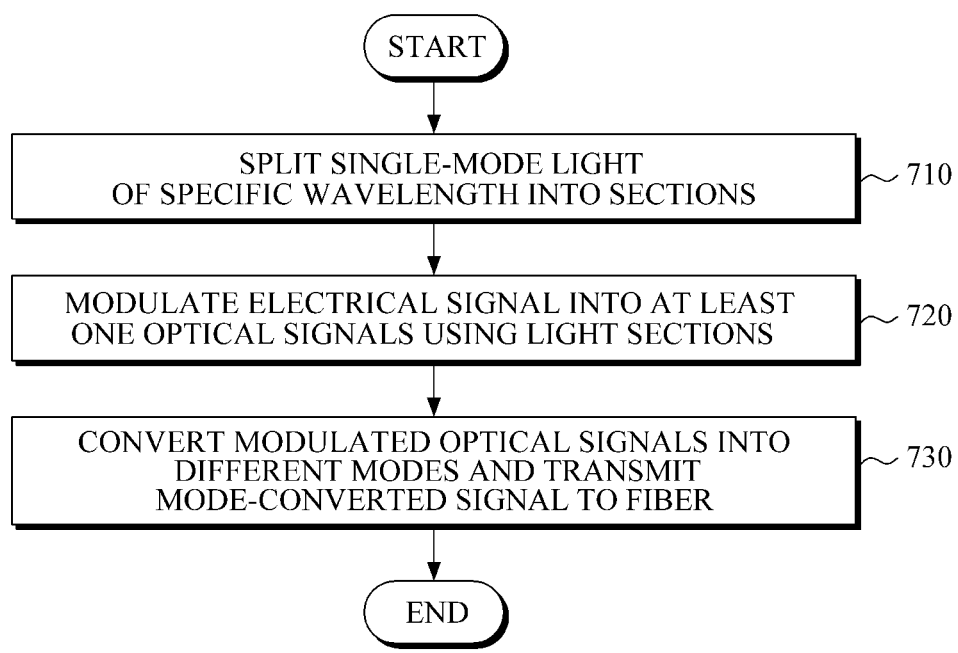
FIG. 7 is a flowchart illustrating a multi-mode fiber-based optical transmission method according to an exemplary embodiment.

FIG. 7 is a flowchart illustrating a multi-mode fiber-based optical transmission method according to an exemplary embodiment.

Referring to FIG. 7, in operation 710, an optical transmission apparatus splits single-mode light with a specific wavelength into a plurality of sections. For example, light of mode LP01 as shown in FIG. 1 may be split into a number of sections corresponding to the number of modes that can be supported by a few-mode fiber. In operation 720, the optical transmission apparatus modulates at least one electrical signal with different data into at least one optical signal by use of the light section. Here, various modulation schemes may be used, including non-return-to-zero (NRZ), quadrature phase shift keying (QPSK), and quadrant amplitude modulation (QAM). In operation 730, the optical transmission apparatus converts the mode of each modulated optical signal to a different mode, and transmits the mode-converted optical signal to a fiber. In another example, in operation 730, the optical transmission apparatus converts the split transmission light and the modulated optical signal into multi-mode, and transmits a resulting signal of multi-mode to the fiber.

FIG. 8 is a flowchart illustrating a multi-mode fiber-based optical reception method according to an exemplary embodiment.

Referring to FIG. 8, in operation 810, an optical reception apparatus separates multi-mode optical signal transmitted through a fiber into single-mode optical signals. For example, the optical reception apparatus may separate a combination signal of multiple modes $LP_{01}$, $LP_{11a}$, and $LP_{11b}$ into single-mode optical signals of mode $LP_{01}$. In another example, light from the transmission light source may be separated from the combined multi-mode optical signal transmitted through the fiber. In operation 820, the optical reception apparatus splits light of the same wavelength as the light of the transmission light source into a plurality of sections. For example, the optical reception apparatus may split the light of a reception light source or split the light of the transmission light source that has been separated from the multi-mode combination optical signal. In operation 830, the optical reception apparatus mixes the separated single-mode optical signal and the split light section to generate a baseband signal, and converts the baseband signal into an electrical signal. In operation 840, the optical reception apparatus recovers digital data by converting the electrical signal into a digital signal. In addition, after converting the electrical signal into the digital signal, the optical reception apparatus compensates for a phase and frequency offset of the digital signal, and recovers the digital data through the compensation of polarization separation and chromatic dispersion. Further, the optical reception apparatus reduces crosstalk among the modes, which may be caused by interference between the different modes during the transmission of the signal through a few-mode fiber.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical transmission apparatus comprising:
   a transmission light source configured to generate single-mode light of a specific wavelength;
   a power coupler configured to split the light generated by the transmission light source into a plurality of light sections;
   at least one modulator configured to modulate an electrical signal carrying different data into at least one optical signal using the light section from the power coupler; and
   a mode multiplexer configured to convert the modulated optical signal into a different mode, and transmit the mode-converted optical signal to a fiber,
   wherein the mode multiplexer comprises:
      a multi-core fiber with a same number of cores as a number of modes to be multiplexed, the cores extending in parallel to each other, and
      a waveguide connecting the multi-core fiber and the fiber, and having a same number of cores as a number of modes to be multiplexed with gaps therebetween decreasing toward an exit end of the waveguide.

2. The optical transmission apparatus of claim 1, wherein a number of modulators is identical to a number of modes that can be supported by the fiber.

3. The optical transmission apparatus of claim 1, wherein:
   a number of modulators is calculated by subtracting 1 from a number of modes that can be supported by the fiber, and
   the mode multiplexer receives transmission light split by the power coupler, and at least one optical signal converted by at least one of the at least one modulator and transmits the received light and signal to the fiber.

4. The optical transmission apparatus of claim 1, wherein the at least one modulator uses one modulation scheme, among which includes non-return-to-zero (NRZ), quadrature phase shift keying (QPSK), and quadrant amplitude modulation (QAM).

5. The optical transmission apparatus of claim 1, wherein the fiber is a few-mode fiber (FMF).

6. The optical transmission apparatus of claim 1, wherein the mode multiplexer is a multi-core fiber that has a same number of cores as a number of modes to be multiplexed, and gaps between the cores decrease toward an exit end of the multi-core fiber.

7. The optical transmission apparatus of claim 1, wherein the mode multiplexer comprises a waveguide with a same number of cores as a number of modes to be multiplexed wherein gaps between the cores decrease toward an exit end of the waveguide.

8. The optical transmission apparatus of claim 1, wherein the waveguide is made of glass or crystal with a 3-dimensional structure by partially changing an index of refraction of the glass or crystal.

9. An optical reception apparatus comprising:
   a mode demultiplexer configured to separate a multi-mode combination optical signal transmitted through a fiber into single-mode optical signals;
   a reception light source configured to generate light of a same wavelength as light of a transmission light source;
   a power coupler configured to split the light of the reception light source into a plurality of sections;
   at least one demodulator configured to mix the single-mode signals separated by the mode demultiplexer and the light sections split by the power coupler to generate a baseband signal and convert the baseband signal to an electrical signal; and
   a digital signal processor configured to recover digital data by converting the electrical signal into a digital signal,
   wherein the mode demultiplexer comprises a multi-core fiber and a waveguide, the multi-core fiber has a same number of cores as a number of multiplexed modes, the cores extending in parallel to each other, and the waveguide comprises a same number of cores as a number of the multiplexed modes and connects another fiber and the multi-core fiber with the cores, wherein the gaps between the cores of the waveguide increase toward an exit end of the waveguide.

10. The optical reception apparatus of claim 9, wherein the digital signal processor is configured to eliminate crosstalk caused by interferences between different modes.

11. The optical reception apparatus of claim 9, wherein the mode demultiplexer is a multi-core fiber with a same number of cores as a number of multiplexed modes wherein gaps between cores decrease toward an exit end of the multi-core fiber.

12. The optical reception apparatus of claim 9, wherein the mode demultiplexer comprises a waveguide with a same number of cores as a number of multiplexed modes, and gaps between the cores increase toward an exit end of the waveguide.

13. An optical reception apparatus comprising:
   a mode demultiplexer configured to separate a multi-mode combination optical signal transmitted through a fiber into single-mode optical signals;
   a power coupler configured to split light of a transmission light source which has been separated by the mode demultiplexer;
   at least one demodulator configured to mix the single-mode signals separated by the mode demultiplexer and light split by the power coupler to generate a baseband signal and convert the baseband signal to an electrical signal; and
   a digital signal processor configured to recover digital data by converting the electrical signal into a digital signal,
   wherein the mode demultiplexer comprises a multi-core fiber and a waveguide, the multi-core fiber has a same number of cores as a number of multiplexed modes, the cores extending in parallel to each other, and the waveguide comprises a same number of cores as a number of the multiplexed modes and connects another fiber and the multi-core fiber with the cores, wherein the gaps between the cores of the waveguide increase toward an exit end of the waveguide.

14. The optical reception apparatus of claim 13, wherein a number of the demodulators is obtained by subtracting 1 from a number of modes that can be supported by the fiber.

15. A multi-mode fiber-based optical transmission method of an optical transmission apparatus, the multi-mode fiber-based optical transmission method comprising:
   splitting single-mode light of a specific wavelength into a plurality of light sections;
   modulating at least one electrical signal carrying different data into at least one optical signal using the split light section; and converting the modulated optical signal into a different mode using a mode multiplexer, and transmitting the mode-converted optical signal to a fiber using a mode multiplexer, wherein the mode multiplexer comprises:
- a multi-core fiber with a same number of cores as a number of modes to be multiplexed, the cores extending in parallel to each other, and
- a waveguide connecting the multi-core fiber and the fiber, and having a same number of cores as a number of modes to be multiplexed with gaps therebetween decreasing toward an exit end of the waveguide.

16. The multi-mode fiber-based optical transmission method of claim 15, wherein the transmitting of the mode-converted optical signal comprises converting the light section, split from the single-mode light, and the at least one optical signal modulated from the at least one electrical signal into multi-mode, and transmitting the mode-converted light and optical signal to a fiber.

17. A multi-mode fiber-based optical reception method of an optical reception apparatus, the multi-mode fiber-based optical reception method comprising:
- separating a multi-mode combination optical signal transmitted through a fiber into single-mode optical signals using a mode demultiplexer;
- splitting light into a plurality of sections, the light with a same wavelength as that of light of a transmission light source;
- mixing the single-mode signals separated from the multi-mode combination signal and the split light sections to generate a baseband signal, and converting the baseband signal to an electrical signal; and
- recovering digital data by converting the electrical signal into a digital signal, wherein the mode demultiplexer comprises a multi-core fiber and a waveguide, the multi-core fiber has a same number of cores as a number of multiplexed modes, the cores extending in parallel to each other, and the waveguide comprises a same number of cores as a number of the multiplexed modes and connects another fiber and the multi-core fiber with the cores, wherein the gaps between the cores of the waveguide increase toward an exit end of the waveguide.

18. The multi-mode fiber-based optical reception method of claim 17, wherein the separating of the multi-mode combination optical signal comprises separating light of a transmission light source from the multi-mode combination optical signal transmitted through the fiber, and the splitting of the light comprises splitting the separated light of the transmission light source into a plurality of sections.

* * * * *